United States Patent [19]

Masor

[11] Patent Number: 4,796,289
[45] Date of Patent: Jan. 3, 1989

[54] MULTI-LINE NETWORK INTERFACE

[76] Inventor: Randall B. Masor, 9010 Rowan, Houston, Tex. 77036

[21] Appl. No.: 163,953

[22] Filed: Mar. 3, 1988

Related U.S. Application Data

[63] Continuation of Ser. No. 13,692, Feb. 12, 1987, abandoned.

[51] Int. Cl.$^4$ .............................................. H04M 1/24
[52] U.S. Cl. ...................................... 379/26; 379/399; 361/426; 439/718
[58] Field of Search ...................... 379/29, 22, 26, 399, 379/27, 428, 429, 327; 361/426, 428; 339/198 R

[56] References Cited

U.S. PATENT DOCUMENTS 4,647,725  3/1987  Dellinger et al. ...................... 379/29
4,651,340  3/1987  Marson ............................ 379/327 X Primary Examiner—Stafford D. Schreyer
Attorney, Agent, or Firm—Gunn, Lee & Jackson

[57] ABSTRACT

Customer telephone line test apparatus enabling a customer having multiple internal telephone lines to determine if telephone line problems are in service company lines or in customer lines. The test apparatus includes a multi-line, customer test type network interface module having telephone circuit test receptacles that are electrically coupled with respective telephone service lines. Telephone jacks for each customer service line and are normally assembled with respective telephone circuit receptacles to complete the telephone circuits with the telephone service supplier. For test purposes, the customer will disassemble a telephone jack from its receptacle and simply insert the modular jack of the telephone in its place. If a clear dial tone is received and the difficulty is eliminated, then the customer is assured that the telephone trouble is in the customer line and not in the service company line.

10 Claims, 2 Drawing Sheets

MULTI-LINE NETWORK INTERFACE

This is a continuation of Ser. No. 013,692 filed 2/12/87, now abandoned.

FIELD OF THE INVENTION

This invention relates generally to telephone service installation systems for customers having multiple phone lines. More specifically, the present invention relates to a telephone network interface including a multiple line modular jack having facilities therein enabling customers to perform simple tests to determine if telephone trouble exists in customer service lines or the lines of a telephone service supplier and enabling the telephone service company to test its telephone supply circuits.

BACKGROUND OF THE INVENTION

When a telephone customer having a number of incoming telephone lines is experiencing difficulty with telephone service, the difficulty may lie in the telephone circuitry of the telephone service supplier, referred to herein as the "telephone company" or "telephone service company", or in the customer's internal telephone lines. In the event of such difficulty ordinarily the customer places a call to the telephone service supplier and requests that service personnel come to his facility and perform the repairs that are necessary. When telephone line service personnel arrive at the facility and conduct tests, the source of the difficulty is quickly determined. Heretofore, the telephone service company was responsible to deliver a proper telephone signal to the telephone instruments of the customer. In many cases these telephones are owned by the telephone service company and leased or rented by the customer. Recent changes in telephone service responsibilities have caused the telephone service company to be responsible only to deliver a proper telephone signal to the customer's facility. The customer is then responsible for maintenance of any internal telephone circuits interconnecting telephones and and other telephone equipment with the signal junction provided by the telephone service company.

In a single or multi-line telephone service installation for businesses a single network interface is placed inside the customer's premises and is typically affixed to the wall structure. To suit the needs of the customer, the network interface is typically located in a service room, storage room, closet, etc. There are several types of network interfaces in use at the present time. For example, the NWI RJ11C network interface is employed for single line applications. For two line applications, the NWI RJ14C network interface is employed. The NWI RJ25 network interface is employed when the installation incorporates three lines. Vendors may request older type interfaces such as the RJ21X, RJ31X, RJ45S and the RJ41S. The only network interface identified above that can be fully tested by the customer is the NWI RJ11C network interface. All of the other types of network interfaces will require a service call vendor or the telephone service company in order to accomplish complete testing.

In multi-line telephone service installations, a single line network interface must be installed inside the customer's location for testing and wiring simplicity. A typical network interface in present use is the NWI RJ11C which is designed for a maximum of 25 pairs of telephone lines.

If, upon inspection of the network interface by service personnel, the electrical problem is found to be in the customer's telephone lines, the customer is notified of the difficulty and receives a service charge from the telephone company for the inspection. Thereafter, the customer's own service personnel must be utilized to correct the difficulty. The customer must pay the telephone service company for the inspection and then must pay telephone repair personnel to have its telephone system repaired if internal line trouble is encountered.

Telephone service network interfaces such as that set forth in U.S. Pat. No. 4,647,725 have been developed for single line installations which incorporate test receptacles for an incoming telephone line. Integral jack connections coupled with the customer telephone circuit are received by the test receptacle of the network interface to maintain connection of customer telephone circuits with the service circuits of the telephone service company. For customer verification of the conditions of the incoming telephone circuit from the telephone service company, the integral jack is removed from the test receptacle and the connector jack of a telephone instrument is inserted into the test receptacle. If a clear dial tone is heard on the telephone handset the customer then is aware that the incoming service signal from the telephone utility company is proper and that the telephone line trouble is located in the customer lines or equipment.

Multiple line network interface modules with line testing capability have also been developed as indicated by U.S. Pat. No. 4,651,345. At the present time, however, no multiple line telephone system has been developed which incorporates facilities for line testing and which may be substituted in place of the conventional RJ21X connecting block. The only multiple-line interfaces that are presently commercially available to not provide the customer with the capability of conducting line tests and making telephone connections to the module.

It is desirable therefore to provide multiple line telephone service customers with an integral telephone network interface module which can be efficiently substituted for a conventional RJ21X connecting block and which provides a simple and efficient facility for conducting tests for each of the incoming telephone lines, thus enabling the customer to make an initial determination whether the service difficulty lies in the equipment of the telephone service company or in the customer's internal telephone circuitry. If the customer is enabled to conduct this type of test for a multiple line telephone facility without difficulty and without requiring an extraordinary level of skill, the service charge ordinarily levied by the telephone service company and the time required for service calls by service company repair personnel can be effectively eliminated. The circuit testing facility is provided at minimal exposure and without excessive clutter of equipment in the customer's telephone network area. The customer, after conducting a simple test and determining that the difficulty lies in its internal circuitry, can simply call service personnel to conduct repairs. If the difficulty is found to lie in the incoming circuitry of the telephone service company, that company can be called instead in order that its service personnel may conduct appropriate repairs at no cost to the customer.

SUMMARY OF THE INVENTION

It is a principal feature of the present invention to provide a network interface construction for multiple line telephone installations which permits customers to simply and effectively conduct appropriate tests to quickly determine whether telephone difficulties being experienced relate to the incoming telephone circuitry of the telephone supplier company or the internal telephone circuitry of the customer.

It is also a feature of this invention to provide customer telephone test apparatus for multiple line telephone installations that may be simply and efficiently utilized without requiring any significant degree of electrical skill or knowledge on the part of customer personnel.

Among the several features of this invention, is contemplated the provision of customer telephone test apparatus for multiple line telephone installations which may be simply and efficiently incorporated within a network interface module having a configuration and dimensions similar to that of conventional modular jack apparatus.

It is another feature of this invention to provide a novel network interface construction for multiple line service users which effectively permits efficient testing by telephone company service personnel as well as by customers. It is also a feature of this invention to provide a novel customer telephone test apparatus for multiple line telephone installations which is of simple nature, is reliable in use and low in cost.

Briefly, the multi-line network interface of this invention is typically an elongated rectangular module structure having multiple pairs of circuit connector screws on one side to secure the incoming telephone lines of the telephone service company "facility side" in electrical connection with the modular jack. On the opposite side of the modular jack are multiple pairs of connector screws for connection of customer internal telephone lines (the customer provided equipment "CPE side") to the modular jack. The modular jack may also be provided with a multiple circuit multi-block amphonal for connection of multiple lines to multiple internal equipment of the customer. The related pairs of connector screws of the facility side are in turn interconnected with half-ringer circuits which are secured within the network interface. The multi-line network interface incorporates a module body of generally rectangular construction is provided which has sidewall panels integrally interconnected with a front wall support panel. In one form of the invention a connector block is provided which is typically maintained in assembly against the support panel of the module body and which includes a plurality of pairs of exposed circuit connector screws for service company and customer telephone circuit connections. The connector block also includes a plurality of contact pins projecting through multiple slots in the connector block to thus provide for snap-on assembly of telephone circuit components. In another form of the invention telephone circuit apparatus is supported directly by the support panel of the module body. Within the module body is also provided half-ringer circuits for each customer telephone line to enable efficient testing by telephone service personnel. The module body is closed by means of a cover construction which protects the internal electrical components from contamination and prevents inadvertent contact of foreign objects with the contact screws of the module body.

Each telephone line circuit is provided with a modular jack which is releasably received within a circuit test receptacle. When telephone trouble is experienced the customer will merely remove modular plugs from the circuit test receptacles thus disconnecting selected ones of the customer's internal telephone lines from the multi-line network interface. A customer telephone is then moved to the site of the network interface and its modular plug is inserted into one of the test receptacles. The telephone, at this point, will be connected directly to the incoming lines of the telephone service company. If the telephone trouble persists, it is not in the customer's line, but rather in the telephone service company's line or the telephone itself. By substituting another telephone, that is known to be in functioning order, it can be positively determined that the trouble lies in the incoming lines of the telephone company. A service call is then placed to the telephone service supplier who will restore the incoming line to working order without necessitating a service charge. If the difficulty lies in the customer's telephone circuitry appropriate service personnel can be called to correct the problem thus avoiding the expense of a service charge by the telephone service supplier. The improved multiple telephone line modular jack apparatus is employed in place of a single network interface and the RJ21X connection block which has no customer testing features. It may be employed with a multi-block amphonal or used as a single line RJ11C interface, or two line RJ14C interface. It may also be interconnected in straight line manner which a modular plug for key service telephone interchange units that plug directly into a modular network interface. This multi-line network interface also allows long distance and burglar alarm vendors to more efficiently interconnect their equipment. Their equipment must be interconnected in front of the telephone equipment.

BRIEF DESCRIPTION OF THE DRAWINGS

So that the manner in which the above recited features, advantages and objects of the present invention are attained and can be understood in detail, more particular description of the invention briefly summarized above, may be had by reference to the embodiment thereof which is illustrated in the appended drawings. Which drawings form a part of this specification.

It is to be noted, however, that the appended drawings illustrate only a typical embodiment of this invention and are therefore not to be considered limiting of its scope, for the invention may admit to other equally effective embodiments.

IN THE DRAWINGS

Figure 1:
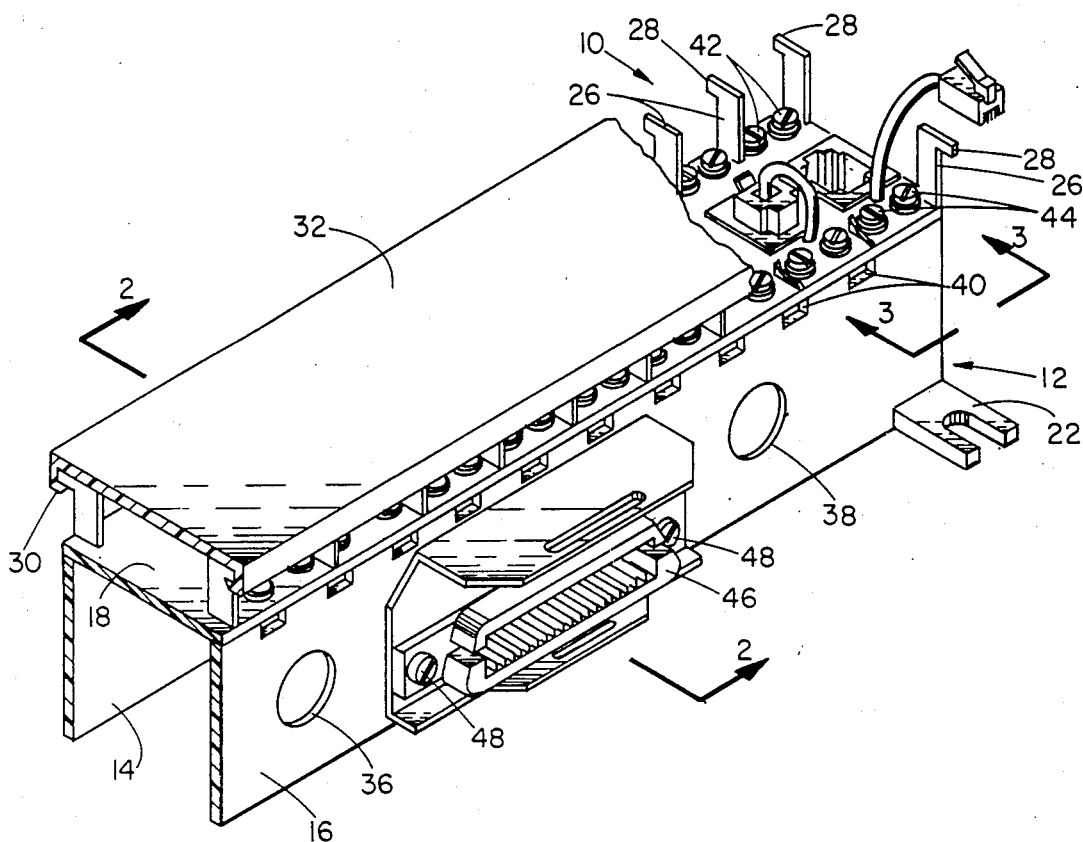

FIG. 1 is an isometric illustration of a network interface constructed in accordance with the present invention and having parts thereof broken away and showing one connector jack disconnected from its test receptacle and another connector jack installed within its test receptacle.

Figure 2:
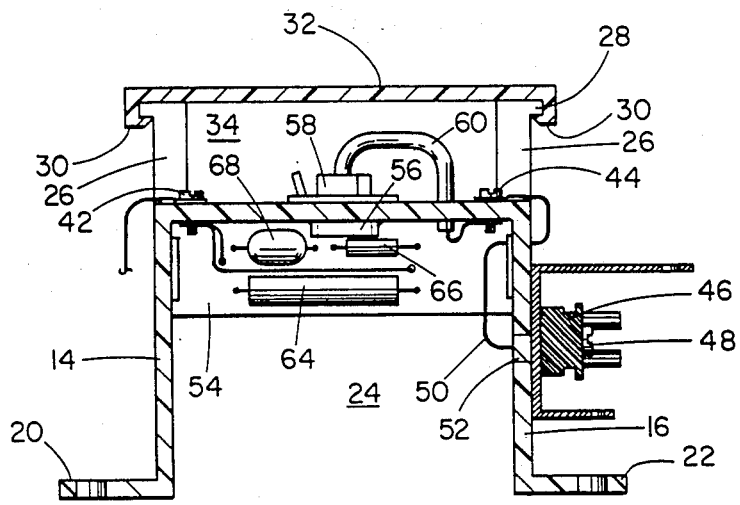

FIG. 2 is a sectional view taken along line 2—2 of FIG. 1 and illustrating the circuitry of a single telephone line with its connector jack assembled into the respective connector receptacle.

Figure 3:
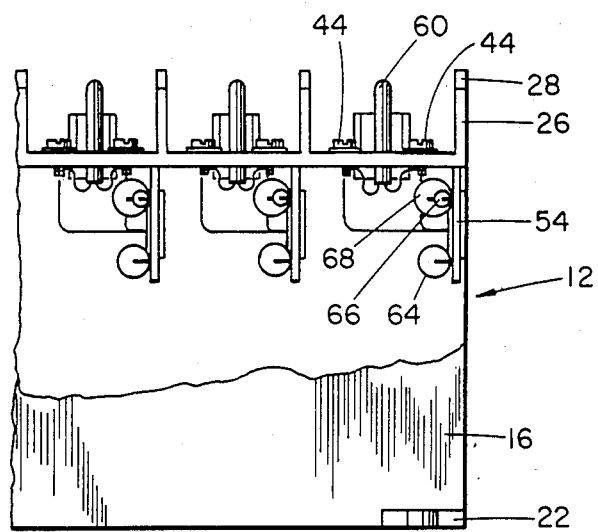

FIG. 3 is a partial side view of the network interface of FIG. 1 taken along line 3—3 and having parts thereof broken away for illustration of three of its multiple telephone lines with the respective connector jacks interconnected within respective test receptacles.

Figure 4:
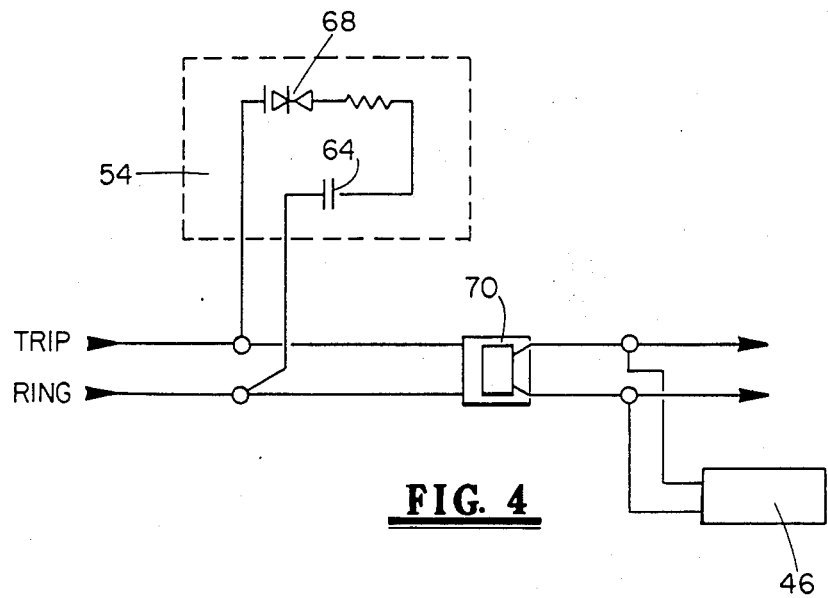

FIG. 4 is an electrical schematic illustration showing one of the telephone circuits of the network interface of FIGS. 1, 2 and 3.

DETAILED DESCRIPTION OF PREFERRED EMBODIMENT

Referring now to the drawings and first to FIG. 1 a network interface constructed in accordance with the present invention is illustrated generally at 10 and includes a module body illustrated generally at 12. The customer test type network interface is of similar configuration and dimension as compared to an RJ21X modular jack which it replaces. This feature enables the network interface module of this invention to be substituted for a RJ21X interface module without requiring any additional mounting space. The module body incorporates a pair of side panels 14 and 16 and a front panel or support panel 18. From the side panels 14 and 16 extend connector projections 20 and 22 which facilitate connection of the module body to a support structure such as the wall structure of a building. The front panel and side panels cooperate to define a protective chamber 24 within which part of the electrical components of the telephone system is located. A plurality of support posts 26 extend upwardly from side portions of the front panel 18 and include upper flanges 28 that are received by hook-like side flanges 30 of a protective cover 32. The protective cover cooperates with the front panel 18 to define a second protective enclosure 34 within which other electrical components of the telephone circuitry are located.

At least one and preferably both of the side panels 14 and 16 define openings 36 and 38 and a plurality of small openings 40 to enable efficient wiring of the network interface. The support panel 18 of the module body is also provided with a plurality of incoming line connector screws 42 and outgoing connector screws 44. The incoming line connector screws are provided to enable connections with incoming telephone service lines. Connector screws 44 enable the connection of the customer's internal telephone lines to the network interface.

A multiple connector block 46 which is also referred to herein as a multi-block amphonal may be connected to side panel 16 of the module body such as by connector screws 48. Use of a multi-block amphonal is optional as mentioned above. Where a multi-block amphonal is used a multi-line telephone cable 50 extends from the multi-block amphonal and passes through an opening 52 formed in the sidewall structure 16. Appropriate lines from the multi-line cable extend through the small openings 40 at the upper end of the sidewall panel and thence are interconnected in pairs with the respective customer line connector screws 44.

Within the protective chamber 24 is located a plurality of printed circuit boards 54 each containing a half-ringer circuit coupled with respective ones of the incoming lines of the telephone supply company. Each half-ringer circuit is also coupled with a respective one of a plurality of jack receptacles 56 that are supported within the support panel 18 of the module body. Each receptacle 56 is adapted to receive a telephone jack connector 58 which is coupled via a flexible conductor line 60 with connector screws 44. From the connector screws 44 extend the customer's internal service lines in pairs to various telephone instruments located about the premises. The circuit boards 54 each have half-ringer circuits including a capacitor 64 in series connection with a resistor 66. The resistor is in turn in series connection with a diode 68.

Referring now to FIGS. 3 and 4, the mechanical illustration and diagram illustrate the tip and ring signal lines incoming from the telephone company. The half-ringer circuit is shown in connection with the tip and ring lines as shown. Also a multi-block amphonal 46 may be coupled with the tip and ring lines if its use is desired.

With the connector jacks 58 inserted within the respective receptacles 56 telephone signals, tip and ring signals will be received by the network interface. These signals will be conducted from the incoming connector screw connections 42 and through the half-ringer circuitry and jack connection circuitry to the customer's connector screws 44 and thence to the customer's inside lines. In the event one of the customer's inside lines is experiencing telephone difficulty, the typical procedure in the past would have been to place a call to the telephone supply company requesting service because modular jacks such as the RJ21X modular jack are not provided with any type of customer test apparatus. An experienced telephone service technician is required to determine the source of line trouble. If the telephone service problem is found to be in the customer's inside lines then the telephone company typically will not perform repair services. Instead, a service charge is rendered by the telephone company without any repair having been completed since it was necessary for telephone company personnel to visit the site. The customer would then have to place another call to different service personnel who would perform service on the customer's inside lines.

In accordance with the present invention, the customer will disconnect a telephone instrument known to be in working order from the telephone jack receptacle at a wall mounted receptacle. That telephone instrument is then transported to the location of the customer test type multi-line network interface of this invention. The protective cover 32 is simply removed thereby exposing the various telephone jacks 58. After the proper customer's line circuit has been identified, the telephone jack associated with that line is disconnected, thereby disconnecting the customer's internal telephone lines from the telephone supply lines of the telephone company. The modular jack of the telephone is then inserted into the receptacle thus directly connecting the circuitry of the telephone with the incoming circuitry provided by the telephone company. If a clear dial tone is obtained, and the telephone functions properly, a clear indication is provided that the difficulty lies in the customer's internal service lines. The company will then call appropriate service personnel to conduct repair operations. If the telephone jack is inserted into the test receptacle and the telephone still does not operate properly, the difficulty is either in the telephone itself or in the supply lines of the telephone company. The customer can then use a different telephone and conduct a similar test to insure that the problem is not in the telephone instrument. A call can then be made to the telephone company who will conduct appropriate repairs on its own service lines without rendering a service charge to the customer.

According to the present invention a multi-line customer test type modular jack is provided which basically replaces conventional jacks such as the RJ21X connecting block. This multi-line, customer test modular jack is approximately the same dimension and configuration as the RJ21X connecting block and therefore can be efficiently mounted in the customer's facility since it occupies no greater wall space than the connecting block it replaces. The present invention provides the customer with the ability to test multiple lines without incurring the expense of specially trained service personnel. The customer's test type connecting block apparatus has flexibility of installation since it can be employed three ways. It can be used with a multi-block amphonal type multi-line connector. The network interface is capable of being wired directly to the screws on the customer line side thereof. It can be connected by an modular plug with the telephone being plugged directly into the network interface. Further, the amphonal and screws on the customer line side of the network interface can be utilized at the same time, thereby developing an efficient connection from a multi-line key telephone system.

Advantages of the multi-line network interface of the present invention are as follows: when a customer or vendor orders a network interface, the present invention guarantees a network interface on each line thereby enabling the customer to efficiently test each line prior to making a service call to the telephone service supplier or to a vendor for repair services. The telephone service companies will be able to reduce storage and handling of other network interfaces that are not capable of providing complete customer access. The telephone service company will save time during installation due to simplicity of the multi-line network interface. Often a customer or vendor will order a network interface which is not the appropriate network interface for their particular equipment. This typically results in the necessity of the telephone service company to reschedule installation procedures. The network interfacer of the present invention will enable the telephone service company to avoid such rescheduling. For example, a NWI RJ11C network interface provides a connection facility for twelve lines and requires from one to two hours for installation. If the customer's requirements call for an RJ21X connecting block, its installation would be in the range of one-half hour to place. The RJ21X unit is still being used to date. Following deregulation of telephone service providers, the RJ21X unit should have been conserved as outdated because it is not accessible by the customer for testing each line. The multi-line network interface of the present invention provides all of the features of the RJ21X and additionally provides for the testing of each line. The multi-line network interface allows for efficient connection of long distance services, burglar alarm connections, etc. These services are easily tapped in front of the telephone equipment without removing existing network interface testing apparatus. If a multi-line network interface is already in place, and additional lines are later requested, service personnel will merely place a cross-connect wire from the existing telephone company terminal to the multi-line network interface. No additional blocks would be required unless the existing network interface lacks additional connections.

In view of the foregoing, it is apparent that the present invention is clearly adapted to accomplish all of the features hereinabove set forth together with other features which will become obvious and inherent from a description of the apparatus itself. If will be understood that certain combinations and subcombinations are of utility and may be employed without reference to other features and subcombinations. This is contemplated by and is within the scope of the present invention.

What is claimed is:

1. A multi-line telephone line installation and test system comprising:
   (a) a multi-line network interface module having an elongated module body of substantially the same dimensions as a typical multi-line modular jack, said module body forming a support panel, said support panel having multiple pairs of company line and customer line connectors for multiple telephone circuits;
   (b) a plurality of telephone circuit test receptacles being fixed in said support panel and being electrically coupled with respective pairs of company line connectors;
   (c) a plurality of half-ringer circuits being located within said modular body and being coupled with respective pairs of company line connectors and with respective ones of said telephone circuit test receptacles;
   (d) a plurality of telephone jack circuits being coupled with respective pairs of said customer line connectors telephone line circuits, each having a telephone jack receivable in removable electrically connected relation within respective ones of said telephone circuit test receptacles; and
   (e) circuit means electrically coupling respective pairs of said customer line connectors with a multi-line modular jack.

2. A multi-line telephone line test system as recited in claim 1, wherein:
   (a) said support panel is of elongated generally rectangular form; (b) said telephone test receptacles are disposed in spaced relation along the length of said support panel.

3. A multi-line telephone line test system as recited in claim 2, wherein:
   multiple pairs of line connectors are positioned along opposite sides of said support panel, one pair on each side of said support panel being coupled respectively with company telephone service supply lines and internal customer telephone circuit lines.

4. A multi-line telephone line test system as described in claim 2, wherein:
   said multiple pairs of company line and customer line connectors are defined by connector screws.

5. A multi-line telephone line test system as described in claim 2, wherein:
   said telephone test receptacles are located along the central portion of said support panel and are positioned between respective pairs of said company line and customer line connectors.

6. A customer multi-line telephone line installation and test system as described in claim 1, wherein said module body comprises:
   a pair of generally parallel spaced side walls being integrally connected to said support panel and cooperating with said support panel and form a protective enclosure, said side walls forming a plurality of spaced telephone circuit openings at the juncture thereof with said support panel, each of said telephone circuit openings being positioned to receive respective company line and customer line telephone circuits.

7. A multi-line telephone line test system as described in claim 6, wherein:

(a) a plurality of cover support posts are formed integrally with said support panel and cooperating with said support panel to form a second protective enclosure; and (b) a protective cover is releasably received by said cover support posts and defines a removable closure for said second enclosure to provide protection for said circuit test receptacles, telephone jack circuits and said pairs of connectors.

8. A multi-line telephone line test system as recited in claim 1, wherein:

(a) said plurality of telephone test receptacles are recessed within the central portion of said support panel and are coupled with respective half-ringer circuits; and (b) a plurality of telephone jacks are normally received within respective ones of said telephone test receptacles and each have flexible conductor means coupled with respective telephone circuits of the customer and, upon being removed from said telephone test receptacles, disconnect respective customer telephone line circuits from the respective telephone line circuits of the telephone service supplier, the open telephone test receptacles providing for direct connection of customer telephone handsets to telephone line circuits of the telephone service supplier for test purposes.

9. A multi-line telephone line test system as recited in claim 6, wherein said half-ringer circuits are located in said protective enclosure between said pair of spaced parallel side walls and beneath said support panel.

10. A multi-line telephone line test system for multiple telephone line installations comprising:

(a) a network interface module having an integral module body having a pair of elongated spaced generally rectangular side walls and an elongated generally rectangular support panel cooperating to form a protective enclosure, said side walls forming a plurality of spaced apertures at the juncture thereof with side support panel;

(b) a plurality of telephone circuit test receptacles being located in fixed relation within said support panel and being located in spaced relation along the length of said support panel, said telephone test receptacles being coupled with a plurality of pairs of circuit connectors carried by said support panel for connection with incoming telephone company lines;

(c) a plurality of half-ringer circuits being located within said protective enclosure and being electrically coupled with respective ones of said telephone test receptacles;

(d) a plurality of telephone jack circuits being receivable in electrically connected relation within said telephone circuit receptacle means and having a plurality of pairs of circuit connectors for establishing connection with internal telephone lines of the customer, said telephone jack circuits including telephone jacks that are removable from said telephone circuit test receptacles to permit direct connection of telephone handsets to telephone company lines for test purposes; and (e) a multiple circuit connector is fixed to said module body and has multiple telephone circuit conductors coupled respectively with said telephone jack circuits.

* * * * *